US012810108B2

(12) United States Patent
Cao et al.

(10) Patent No.: US 12,810,108 B2
(45) Date of Patent: Nov. 24, 2026

(54) DYNAMIC ENTITY REPRESENTATIONS FOR SEQUENCE GENERATION

(71) Applicant: GDM Holding LLC, Mountain View, CA (US)

(72) Inventors: Kris Yue Cao, London (GB); Tomas Kocisky, London (GB); Pinelopi Papalampidi, Edinburgh (GB)

(73) Assignee: GDM Holding LLC, Mountain View, CA (US)

( * ) Notice: Subject to any disclaimer, the term of this patent is extended or adjusted under 35 U.S.C. 154(b) by 790 days.

(21) Appl. No.: 17/960,775

(22) Filed: Oct. 5, 2022

(65) Prior Publication Data

US 2023/0108579 A1 Apr. 6, 2023

(30) Foreign Application Priority Data

Oct. 5, 2021 (GR) .............................. 20210100677

(51) Int. Cl.
*G06N 3/04* (2023.01)

(52) U.S. Cl.
CPC ..................................... *G06N 3/04* (2013.01)

(58) Field of Classification Search
CPC .......... G06N 3/04; G06N 3/088; G06N 3/048; G06N 3/045; G06N 3/08; G06N 3/0455; G06N 3/06; G06N 3/063; G06F 16/3329; G06F 16/3334; G06F 40/279; G06F 40/30
See application file for complete search history.

(56) References Cited

U.S. PATENT DOCUMENTS

| | | | | |
|---|---|---|---|---|
| 11,748,571 | B1 * | 9/2023 | Glavaš et al. | G06F 40/289 704/9 |
| 2020/0225944 | A1 | 7/2020 | Wright et al. | |

FOREIGN PATENT DOCUMENTS

| | | | |
|---|---|---|---|
| AU | 2016342440 | A1 | 5/2018 |
| CN | 110326002 | A | 10/2019 |
| CN | 112685582 | A | 4/2021 |
| CN | 113111190 | A | 7/2021 |

OTHER PUBLICATIONS

Clark, Elizabeth, Yangfeng Ji, and Noah A. Smith. "Neural text generation in stories using entity representations as context." Proceedings of the 2018 Conference of the North American Chapter of the Association for Computational Linguistics: Human Language Technologies, vol. 1. 2018. (Year: 2018).*

FÃ©vry,, Thibault, et al. "Entities as experts: Sparse memory access with entity supervision." arXiv preprint arXiv:2004.07202 (2020). (Year: 2020).*

Shen, Yongliang, et al. "A trigger-sense memory flow framework for joint entity and relation extraction." Proceedings of the web conference 2021. 2021. (Year: 2021).*

(Continued)

*Primary Examiner* — Paulinho E Smith
(74) *Attorney, Agent, or Firm* — Fish & Richardson P.C.

(57) ABSTRACT

Methods, systems, and apparatus, including computer programs encoded on computer storage media, for generating output sequences using entity memory data. In particular, a neural network is used to generate an output sequence conditioned on an input sequence and on the entity memory data.

25 Claims, 5 Drawing Sheets

(56) References Cited

OTHER PUBLICATIONS

Meng, Tao, et al. "GEMNET: Effective gated gazetteer representations for recognizing complex entities in low-context input." Proceedings of the 2021 Conference of the North American Chapter of the Association for Computational Linguistics: Human Language Technologies. 2021. (Year: 2021).*

Rashkin, Hannah, et al. "PlotMachines: Outline-conditioned generation with dynamic plot state tracking." arXiv preprint arXiv:2004.14967 (2020). (Year: 2020).*

Chen, Yu, Lingfei Wu, and Mohammed J. Zaki. "Bidirectional attentive memory networks for question answering over knowledge bases." arXiv preprint arXiv:1903.02188 (2019). (Year: 2019).*

Yao, Jinxin, et al. "A hybrid model with pre-trained entity-aware transformer for relation extraction." International Conference on Knowledge Science, Engineering and Management. Cham: Springer International Publishing, 2020. (Year: 2020).*

Liu, Ye, et al. "Enriching non-autoregressive transformer with syntactic and semanticstructures for neural machine translation." arXiv preprint arXiv:2101.08942 (2021). (Year: 2021).*

Adiwardana et al., "Towards a human-like open-domain chatbot," CoRR, Jan. 27, 2020, arxiv.org/abs/2001.09977, 38 pages.

Brown et al., "Language models are few-shot learners," CoRR, Jul. 22, 2020, arXiv:2005.14165, 75 pages.

Raffel et al., "Exploring the limits of transfer learning with a unified text-to-text transformer," The Journal of Machine Learning Research, Jan. 1, 2020, 21(1):5485-5551.

Vaswani et al., "Attention is all you need," 31st Conference on Neural Information Processing Systems (NIPS 2017), 2017, 11 pages.

Ji et al., "Dynamic Entity Representations in Neural Language Models," CoRR, submitted on Aug. 2, 2017, arxiv.org/abs/1708.00781, 10 pages.

Notice of Allowance in Chinese Appln. No. 202211221856.2, mailed on May 25, 2026, 7 pages (with English translation).

* cited by examiner

DYNAMIC ENTITY REPRESENTATIONS FOR SEQUENCE GENERATION

CROSS-REFERENCE TO RELATED APPLICATION

This disclosure claims priority to Greek application No. 20210100677, entitled "Dynamic Entity Representations for Sequence Generation" and filed on Oct. 5, 2021. The disclosure of the prior application is considered part of and is incorporated by reference in the disclosure of this application.

BACKGROUND

This specification relates to processing inputs using neural networks to generate output sequences.

Neural networks are machine learning models that employ one or more layers of nonlinear units to predict an output for a received input. Some neural networks include one or more hidden layers in addition to an output layer. The output of each hidden layer is used as input to the next layer in the network, i.e., another hidden layer or the output layer. Each layer of the network generates an output from a received input in accordance with current values of a respective set of parameters.

SUMMARY

This specification describes a system implemented as computer programs on one or more computers in one or more locations that generates an output sequence conditioned on an input sequence and data identifying one or more prompt entities.

The subject matter described in this specification can be implemented in particular embodiments so as to realize one or more of the following advantages.

The system described in this specification autoregressively generates an output sequence including a respective output token at each of one or more output positions in the output sequence using a neural network conditioned on an input sequence that includes one or more input tokens and on entity memory data. The system receives data identifying one or more prompt entities, and maintains the entity memory data to include a respective representation for each of the one or more prompt entities. The system initializes the entity memory data for each prompt entity using one or more respective tokens in the data identifying the prompt entity.

Maintaining the memory data for each memory entity as described in this specification can enable the neural network to more accurately incorporate entities into the output sequence. That is, maintaining the entity memory data for each prompt entity can enable the neural network to incorporate a more consistent set of entities throughout the output sequence, and where each entity in the set of entities is associated with a more consistent set of attributes throughout the output sequence. In contrast, more conventional systems without entity memory data generate output sequences with less consistent sets of entities, where entities tend to fall out of the output sequence over long output sequences (e.g., during autoregressive output generation, output sequences of sufficient length to begin dropping the beginning of the output sequence). Additionally, more conventional systems tend to generate output sequences with less consistent sets of attributes for each entity in the set of entities.

The system described in this specification can initialize the entity memory data for each prompt entity in the memory data by processing the data identifying the prompt. Using the data that identifies the prompt entities can enable a user to specify a custom set of important entities, where each important entity has custom associated attributes, for use in generating the output sequence. In contrast, other output sequence generation techniques can process only an input sequence without specifically designating important entities for the generation of the output sequence.

Thus, by using the described techniques, the "first neural network blocks" that make up a pre-trained neural network do not need to be capable of effectively contextualizing and incorporating each possible entity in a large universe of possible entities. Accordingly, by augmenting the first blocks with "second neural network blocks" the described approach allows the training of the neural network to consume fewer computational resources than training a model from scratch that can achieve high performance using only "first neural network blocks," as is attempted by conventional techniques. Moreover, the overall neural network can use fewer "first neural network blocks" to achieve comparable or better performance by effectively incorporating the "second neural network blocks," reducing the number of parameters required and decreasing the memory footprint of the neural network both at inference and during training.

The details of one or more embodiments of the subject matter of this specification are set forth in the accompanying drawings and the description below.

Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
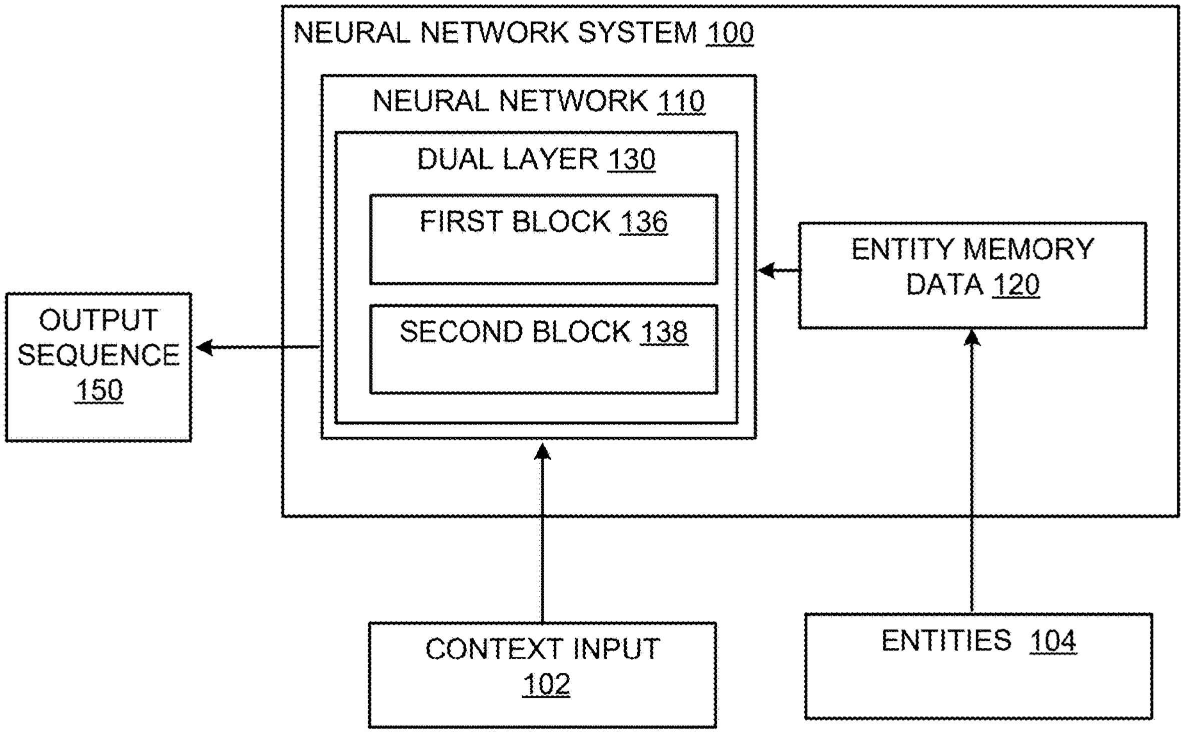
FIG. 1 is a diagram of an example neural network system.

FIG. 1 is a diagram of an example neural network system 100. The neural network system 100 is an example of a system implemented as computer programs on one or more computers in one or more locations, in which the systems, components, and techniques described below can be implemented.

The neural network system 100 is a system that generates an output sequence 150 conditioned on an input sequence 102 and data identifying one or more prompt entities 104.

In some cases, the system 100 obtains data identifying each of one or more prompt entities 104 and an input sequence 102 that includes one or more input tokens.

In some cases, the input sequence 102 is received from a user of the system. For example, the user can provide an input sequence 102 and the user can identify, or the system can determine, which tokens in the input sequence 102 refer to entities.

In some other cases, the input sequence 102 is a placeholder input sequence generated by the system, e.g., a sequence that includes only a predetermined "start" token. In this example, the user can provide only data identifying entities that the user believes are relevant.

As another example, the system can receive the data identifying the prompt entities 104 from another system. For example, the other system can provide entities that are relevant to the current context in which the system 100 needs to generate the output sequence 150.

The system 100 maintains entity memory data 120 that includes respective entity data for each of the one or more prompt entities. That is, the system 100 initializes the entity memory data 120 after receiving the data identifying the prompt entities. As will be described in more detail below, the entity data for each entity characterizes the entity and the context in which the entity appears in the received data.

Initializing the entity memory data is described in more detail below with reference to FIGS. 2 and 5.

The system 100 processes the input sequence 102 and the entity memory data 120 using a neural network 110 to generate an output sequence 150 that includes a respective output token for each of one or more output positions.

Generally, the system 100 can autoregressively generate each output token of the output sequence 150 by processing a combined sequence using the neural network 110 that includes at least a concatenation of the input sequence and any output tokens in the output sequence preceding the output token.

The neural network 110 includes one or more dual layers 130.

For example, the neural network can include a stack of layers that includes (i) one or more dual layers 130 and (ii) an output layer.

Each layer in the stack can receive a layer input that includes a respective token for each token in the combined sequence. For the first layer in the stack, the inputs are the tokens in the combined sequence. For each layer after the first layer in the stack, the inputs are the outputs of the preceding layer.

As a particular example, the stack of layers can include an embedding layer, followed by multiple dual layers and, finally, followed by the output layer. As another particular example, the stack of layers can include an embedding layer, followed by a stack of layers that includes both conventional attention layers, and finally, followed by the output layer.

When generating any given output token, the output layer can process the layer output for the output position from a final dual layer 130 of the one or more dual layers in the neural network 110 to generate a respective score distribution over a vocabulary of output tokens for the output position in the output sequence and then select a respective output token from the vocabulary of output tokens for the output position based on the respective score distribution for the output position. For example, the layer can sample a token or can greedily select the highest scoring token.

Each dual layer 130 includes a respective first neural network block 136 and a respective second neural network block 138.

The first neural network block 136 is a self-attention block that updates the tokens in the layer input for the dual layer 130 to generate a respective hidden representation of each input token in the layer input by performing self-attention.

The second neural network block 138 is a block that updates the tokens in the layer input for the dual layer 130 using the entity memory data 120 to generate a respective entity-aware representation of each layer input token in the layer input.

The dual layer 130 then combines the hidden representations and the entity-aware representations to generate the layer output of the dual layer 130.

Thus, the dual layer 130 updates the tokens in the input to the layer using both the outputs that have been generated so far as part of the output sequence 150 and the entity memory data 120, resulting in a neural network 110 that can greatly improve the way in which it handles entity mentions in the output sequences 150 generated by the neural network.

The operations performed by the dual layers 130 will be described in more detail below with reference to FIGS. 2-5.

The neural network 110 can be configured to process any appropriate input sequence that includes one or more input tokens, e.g., input tokens from a vocabulary of input tokens. The vocabulary of input tokens can include input tokens representing characters (e.g., letters, or pictograph characters), word fragments, words, special separator and punctuation tokens, etc. For example, the input tokens can represent characters, word fragments, and words from human languages (e.g., English, Korean, etc.). In another example, the input tokens can represent code segments from coding languages (e.g., C, C++, Python, etc.). In yet another example, the input tokens can represent other symbols imbued with semantic meaning in a consistent manner.

The neural network 110 can be configured to process any appropriate data identifying each of one or more prompt entities. The one or more prompt entities can be, e.g., important entities for the output sequence to be generated, such as characters in a narrative, or topics of discussion in a report. The data identifying each of the one or more prompt entities can include one or more tokens, e.g., one or more tokens identifying a designator (e.g., a name) for the prompt entity and/or one or more input tokens from the vocabulary of input tokens describing attributes associated with the prompt entity.

The neural network 110 can be configured to generate any appropriate output sequence 150 that includes one or more output tokens, e.g., output tokens from a vocabulary of output tokens. The vocabulary of output tokens can include output tokens representing characters (e.g., letters, or pictograph characters), word fragments, words, special separator and punctuation tokens, etc. For example, the output tokens can represent characters, word fragments, and words from human languages (e.g., English, Korean, etc.). In another example, the output tokens can represent code segments from coding languages (e.g., C, C++, Python, etc.). In yet another example, the output tokens can represent other symbols imbued with semantic meaning in a consistent manner.

In one example, the input sequence 102 can include an input prompt from a user, and the one or more prompt entities can include topics important to the user. The neural network 110 can process one or more input sequences from the user to generate respective output sequences that characterizes replies to the input sequences of the user. For example, the neural network 110 can be a part of a chat bot, and the user can be interacting with the chat bot to receive answers to questions, e.g., a customer service chat bot for a company, or an interactive FAQ bot for addressing in a dynamic manner the most frequently asked questions for a company or service.

In another example, the system 100 can be part of an automatic medical diagnostic system and the prompt entities can be entities provided by a user that characterize the health of the user, e.g., current systems, pre-existing conditions, medications, and so on. The output sequence can be generated as part of a conversation with the user relating to the user's health.

In situations in which the systems discussed here collect information about users, or may make use of such information, the users may be provided with an opportunity to control whether the programs or features collect user information. In addition, certain information may be treated in one or more ways before it is stored or used in an effort to remove personally identifiable information therefrom. Thus, the user may have control over how information is collected about the user and used by systems described herein.

In another example, the input sequence 102 can include a text sequence, and the one or more prompt entities can include topics to be summarized from the text sequence. The output sequence 150 can include a general summary of the text sequence, and a respective sub-summary for each of the one or more prompt entities.

In another example, the input sequence 102 can characterize the opening notes in a song, and the output sequence can be a continuation of the song. The prompt entities can be instruments to be played in the output sequence (e.g., generic or "average" versions of the instruments, or each with certain desired qualities, such being constructed from certain materials, having certain shapes, characterizing particular famous instruments, such as a Stradivarius, or any combination thereof). The prompt entities can collectively characterize a group of instruments, such as those played in an orchestra. In yet another example, the prompt entities can represent particular styles or qualities of music, such as hard rock, death metal vocals, or opera singing to be emulated in the output sequence. In yet another example, the prompt entities can represent the style of individual artists or bands to be emulated in the output sequence.

In another example, the input sequence 102 can include a text sequence that represents the beginning of a narrative, and the prompt entities can include important characters, places, ideas, things, or a combination thereof in the narrative. The output sequence 150 can be a continuation of the narrative.

In another example, the input sequence 102 can include lines of computer code, and the prompt entities can include desired code segments, algorithms, methodologies, or semantic entities to be used in the code (e.g., for-loops, while-loops, etc.). The output sequence 150 can represent a continuation of the lines of computer code, particular use-case examples of the prompt entities, or respective alternative examples of the lines of computer code rewritten using each prompt entity. The system 100 can then provide the generated computer code for execution by one or more computers to carry out some computing task.

As another example, the prompt entities can identify entities in an environment, the input sequence 102 can specify a task to be carried out by an agent in the environment, e.g., a robot or other mechanical agent, and the output sequence can be instructions, e.g., natural language instructions or other instructions, to the agent to cause the agent to carry out the task.

In some implementations, the respective first neural network blocks 132 in each dual layer 130 can be from a self-attention model that has a modified architecture to generate or process longer sequences, e.g., a transformer-XL (T-XL) machine learning model. After autoregressively generating N output tokens in the output sequence, the T-XL model (or other model) can store a representation of the N output tokens in T-XL memory. The T-XL model can store a respective representation of multiple segments of N tokens in T-XL memory. Each time after generating an additional N output tokens, the T-XL can store a representation of the additional N output tokens in T-XL memory, where the representation was generated by the T-XL model. The T-XL model can autoregressively generate each output token in the output sequence by processing a combined sequence of at least the respective representations already in the T-XL memory and any output tokens both preceding the output token and not yet stored in the T-XL memory as part of a respective representation.

Thus, as used in this specification processing a combined sequence can include either processing all of the individual tokens in the combined sequence or processing compressed representations of some or all of the tokens in the combined sequence.

Prior to using the neural network 110 to generate output sequence 150, the system 100 or another training system trains the neural network 110 in order to cause the neural network 110 to accurately generate output sequence.

In particular, the training system can train the neural network 110 on training data that includes multiple training examples. Each training example includes (i) a training input sequence and (ii) a training output sequence that should be generated by the system 100 by processing the training input sequence.

The training system can perform this training in any of a variety of ways. As one example, the first network blocks in each dual layer can be pre-trained, and then the neural network can be trained with both the first network blocks and the second network blocks included to improve the way in which the neural network handles entity mentions.

Figure 2:
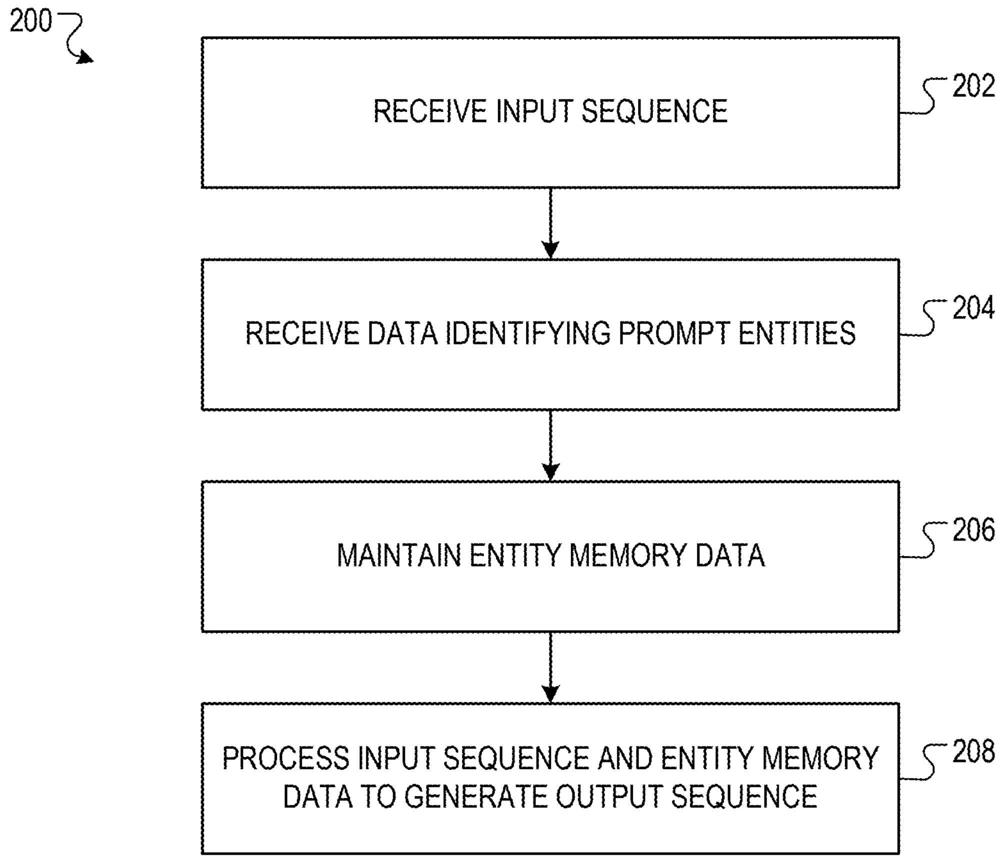
FIG. 2 is a flow diagram of an example process for generating an output sequence.

FIG. 2 is a flow diagram of an example process 200 for generating an output sequence. For convenience, the process 200 will be described as being performed by a system of one or more computers located in one or more locations. For example, a neural network system, e.g., the neural network system 100 depicted in FIG. 1, appropriately programmed in accordance with this specification, can perform the process 200.

The system receives data identifying one or more prompt entities (step 202) and an input sequence that includes one or more input tokens (step 204).

The system maintains entity memory data (step 206).

In particular, the entity memory data includes respective entity data for each of the one or more prompt entities and the respective entity data includes a respective entity representation of the prompt entity.

In some implementations, the respective entity data for each entity includes a static key vector for the entity.

In some other implementations, the respective entity data for each entity includes both a static key vector and a dynamic value vector that can be updated by the system as generation progresses.

In some implementations, the entity memory data further includes respective non-entity data for each of one or more non-entities that represents entity-irrelevant information. Like the data for the entities, the non-entity data can include either a static key or both a static key and a dynamic value.

The system processes the input sequence and the entity memory data using a neural network having one or more dual layers to generate an output sequence that comprises a respective output token for each of one or more output positions in the output sequence (step 208). In particular, as described above, the system generates the output tokens in the output sequence auto-regressively, one after the other, by, for each token, processing a combined sequence.

As part of generating the token at any given output position in the output sequence, the system generates a respective layer input for each of the one or more dual layers and processes the layer input using the dual layer to generate a layer output for the dual layer.

As described above, the layer input generally includes a respective token for each token in the combined sequence and can be generated by the layer that precedes the dual layer in the stack of layers.

Each dual layer has at least (i) a respective first neural network block and (ii) a respective second neural network block and uses both network blocks to generate the respective layer output for the dual layer when generating a given token.

In other words, the neural network generally includes stack of layers (including the one or more dual layers), and to generate the token at any given position in the output sequence, processes a combined sequence that includes the input sequence and any output tokens that have already been generated at positions that precede the given position. In some cases, the system processes a compressed representation of some of the tokens in the combined sequence, as described above. In some other cases, the neural network 110 can have a fixed "context window" and the system can drop tokens that are outside of the context window as part of processing the combined output sequence.

In some implementations, the system also includes an entity prompt in the combined sequence. The entity prompt includes respective tokens identifying each of the entities in the entity memory data, optionally separated by special separator tokens. Including the entity prompt can allow the dual layers to attend over the entity tokens and improve the coherence of the generation.

Processing a layer input for a given dual layer using the dual layer is described in more detail below with reference to FIG. 3.

Figure 3:
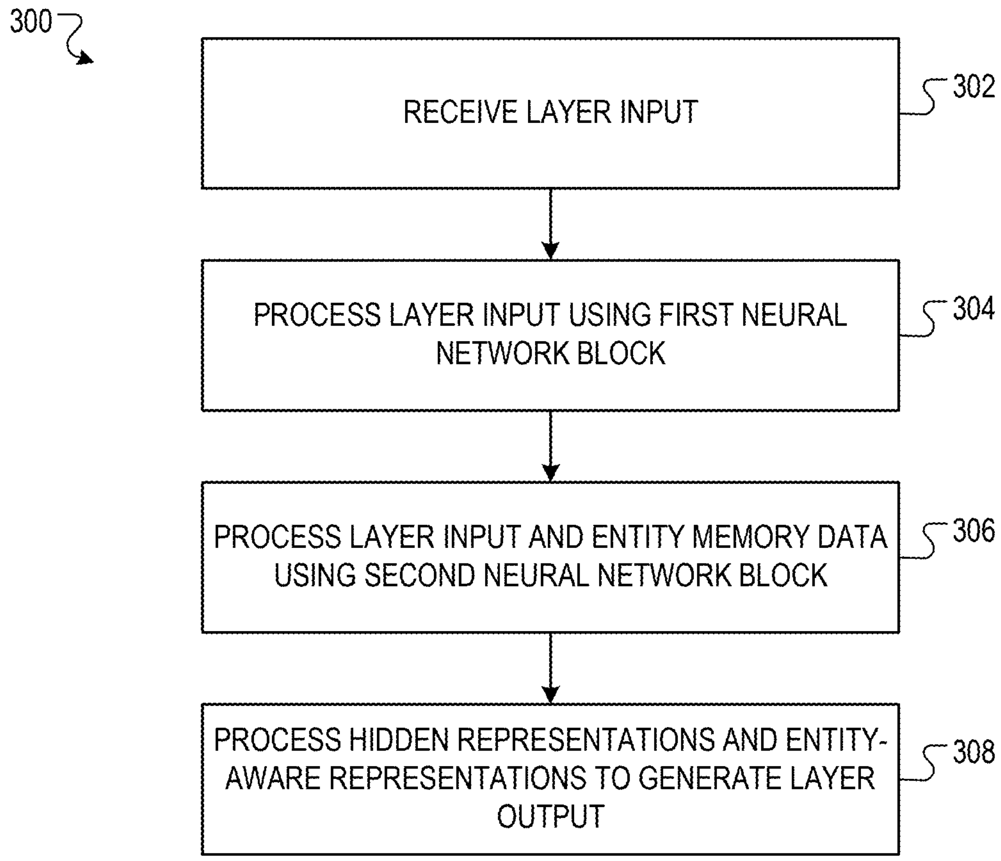
FIG. 3 is a flow diagram of an example process for processing a layer input using a dual neural network layer.

FIG. 3 is a flow diagram of an example process 300 for processing a layer input using a dual layer. For convenience, the process 300 will be described as being performed by a system of one or more computers located in one or more locations. For example, a neural network system, e.g., the neural network system 100 depicted in FIG. 1, appropriately programmed in accordance with this specification, can perform the process 300.

The dual layer receives a layer input for the output position that is based on at least the input sequence and that includes one or more layer input tokens (step 302). For example, when the neural network is configured to process a combined sequence, the layer input includes a respective layer input token for each token in the current combined sequence.

The dual layer processes the layer input using the respective first neural network block to generate a respective hidden representation of each layer input token in the layer input (step 304).

As described above, the respective first neural network block is generally a self-attention layer block that applies self-attention over the tokens in the layer input to generate the hidden representations.

The first block can use any of a variety of self-attention variants in order to perform this processing.

In some implementations, the first block is an attention block from a self-attention model that has a modified architecture to generate or process longer sequences, e.g., a transformer-XL (T-XL) machine learning model. After autoregressively generating N output tokens in the output sequence, the T-XL model (or other model) can store a representation of the N output tokens in T-XL memory. The T-XL model can store a respective representation of multiple segments of N tokens in T-XL memory. Each time after generating an additional N output tokens, the T-XL can store a representation of the additional N output tokens in T-XL memory, where the representation was generated by the T-XL model. The T-XL model can autoregressively generate each output token in the output sequence by processing a combined sequence of at least the respective representations already in the T-XL memory and any output tokens both preceding the output token and not yet stored in the T-XL memory as part of a respective representation.

Thus, in some implementations, the first block attends over the layer inputs that are in the T-XL memory and the layer inputs that have not yet been stored in the T-XL memory.

The first block can also include other components apart from the self-attention layer, i.e., that perform processing before or after the self-attention layer. Examples of such components include feed-forward layers, normalization layers, residual connection layers, and so on.

The dual layer processes the layer input and the entity memory data using the respective second neural network block to generate a respective entity-aware representation of each layer input token in the layer input (step 306).

Generally, for each layer input token in the layer input, the second neural network block uses the entity memory data to update the layer input token to generate the entity-aware representation of the layer input token.

As a particular example, the respective second neural network block can include a cross-attention neural network layer that applies cross-attention into the entity memory data. In particular, the cross-attention layer can, for each layer input token, generate a query derived from the layer input token and perform cross-attention into the entity memory data with and keys and values derived from at least the respective entity representations in the entity memory data to update the layer input. For example, when the entity memory data includes only static keys, both the keys and values can be equal to or derived from the static keys. When the entity memory data includes static keys and dynamic values, the keys can be equal to or derived from the static keys while the values can be equal to or derived from the dynamic values.

The second block can also include other components apart from the cross-attention layer, i.e., that perform processing before or after the cross-attention layer. Examples of such components include feed-forward layers, normalization layers, residual connection layers, and so on.

The dual layer processes the hidden representations and the entity-aware representations to generate a layer output for the output position that has one or more layer output tokens, i.e., that includes a respective layer output token for each token in the layer input (step 308).

In general, the dual layer combines the hidden representations and the entity-aware representations to generate the layer output.

For any given token, the dual layer can combine the representations of the token in any appropriate way.

As a particular example, the dual layer can combine the hidden representations and the entity-aware representations using a gating neural network block that has a plurality of gating parameters to generate the layer output tokens in the layer output.

For example, the gating neural network block can, for each hidden representation, process the hidden representation and the corresponding entity-aware representation in accordance with the plurality of gating parameters to generate a respective gating vector and then combine the hidden representation and the corresponding entity-aware representation in accordance with the respective gating vector to generate a respective layer output token in the layer output.

To generate the gating vector, the gating neural network block can concatenate the hidden representation and the entity-aware representation to generate a combined representation and process the combined representation in accordance with the gating parameters to generate the respective gating vector, e.g., by processing the combined representation through one or more fully-connected layers.

To combine the hidden representation and the corresponding entity-aware representation in accordance with the respective gating vector, the gating neural network block can process the respective gating vector to generate a hidden weight vector and performing an elementwise multiplication of the hidden weight vector and the hidden representation to generate an intermediate hidden representation. Similarly, the block can process the respective gating vector to generate an entity weight vector and perform an elementwise multiplication of the entity weight vector and the entity-aware representation to generate an intermediate entity-aware representation. The block can then sum the intermediate hidden representation and the intermediate entity-aware representation to generate the respective layer output token.

As described above, in some implementations, the entity memory data is static after being initialized while, in some other implementations, the system can update the dynamic values in the entity memory data after initialization. Updating the dynamic values is described below with reference to FIG. 4.

In some implementations, the dual layer implements multi-head attention. In multi-head attention, the dual layer performs the above operations in parallel for each of multiple attention heads. That is, for each token, the system generates a respective hidden representation and a respective entity-aware representation of the token for each of multiple heads. In these implementations, the system combines, for each token and for each head, the respective hidden representation and the respective entity-aware representation of the token to generate an initial layer output token for the head. The system then combines the initial layer output tokens for the heads to generate the layer output token. For example, the system can concatenate the initial layer output tokens. As another example, the system can concatenate the initial layer output tokens and then apply a learned linear transformation to the concatenation. As yet another example, the system can sum or average the initial layer output tokens.

Figure 4:
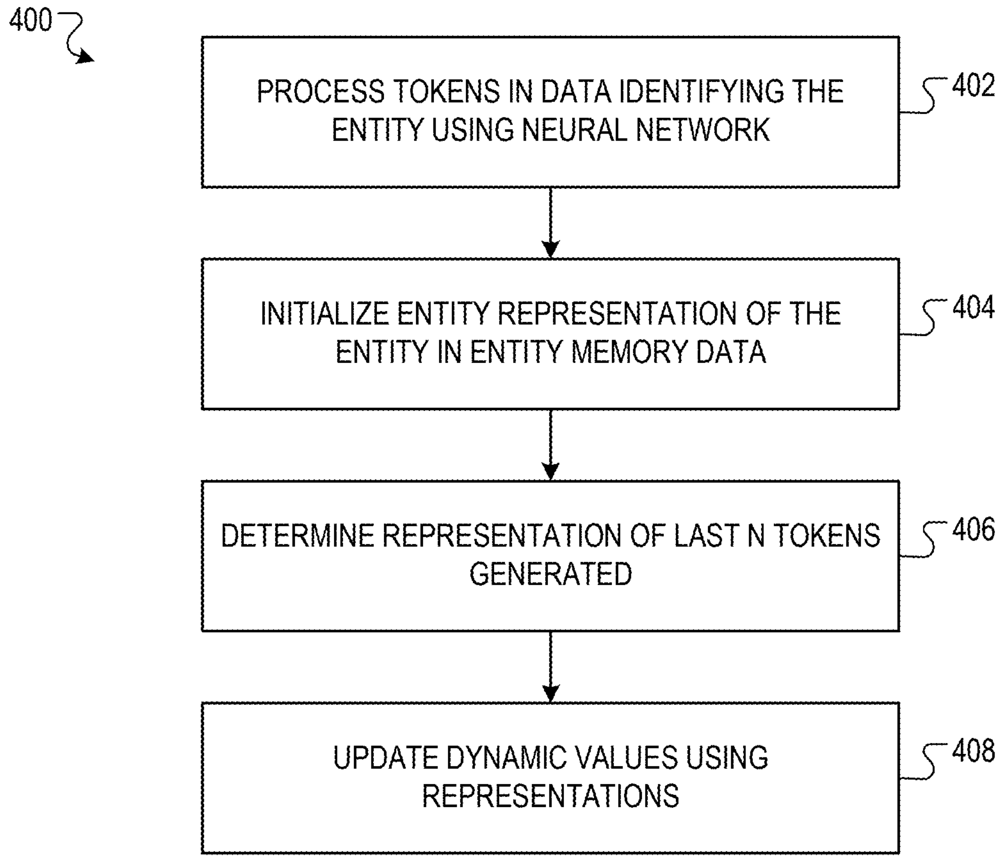
FIG. 4 is a flow diagram of an example process for initializing the scene memory data.

FIG. 4 is a flow diagram of an example process 400 for initializing the entity memory data. For convenience, the process 400 will be described as being performed by a system of one or more computers located in one or more locations. For example, a neural network system, e.g., the neural network system 100 depicted in FIG. 1, appropriately programmed in accordance with this specification, can perform the process 400.

As described above, the entity memory data can include, for each entity, either (i) a static key or (ii) a static key and a dynamic value.

To initialize this data, for each entity, the system processes the data identifying the entity. In some implementations, the system can receive a separate text segment describing each of the entities. In some other implementations, the system can receive a single text segment describing all of the entities. For example, each entity may be mentioned in the initial input sequence received by the system from a user.

In particular, for each entity, the system can process each token in the respective data that identifies the prompt entity using the neural network to generate a respective embedding of each of the tokens (step 402). During the processing, the system uses only the first blocks within the dual layers and not the second blocks. That is, during this processing, for each dual layer, the system receives a layer input that includes one or more layer input tokens, with each layer input token corresponding to a respective one of the tokens that identify the prompt entity, and processes the layer input tokens using the respective first neural network block within the dual layer to generate the respective layer output token for each layer input token without using the respective second neural network block of the dual layer.

The system then initializes the respective entity representation for the prompt entity using the respective embeddings of the tokens for the prompt entity (step 404), i.e., the embeddings of the tokens that correspond to the prompt entity within the data that identifies the entity.

As a particular example, the system can determine an average of the respective embeddings of the tokens for the prompt entity and initialize the respective entity representation for the prompt entity using the average of the respective embeddings of the tokens for the prompt entity.

When the entity memory data includes only a static key, the system can initialize the static key to be equal to the average. When the entity memory data includes both a static key and a dynamic value, the system can initialize both the static key and the dynamic value to be equal to the average.

When the entity memory data includes dynamic values, the system can update the dynamic values at certain points while generating output sequences.

In particular, the system can update the dynamic values after each N-th token is added to the combined sequence that is processed by the neural network. Generally, N is a fixed integer that is greater than one and can be a hyperparameter of the system. That is, for tasks where the system interacts with a user while generating output sequences, the system can perform the update after N tokens that can be a combination of user-generated tokens and system-generated tokens are added to the combined sequence. For tasks where the system generates long output sequences without interaction with the user after the prompt entities and the input sequence are received, the system can perform the update after N tokens have been generated by the system.

To update the dynamic values, the system determines a respective representation of the last N combined sequence tokens for each of the one or more prompt entities (step 406).

For example, the system can determine a hidden representation of the last N combined sequence tokens using the respective first neural network block of the final dual layer of the one or more dual layers in the neural network and determine a respective attended-weight for the last N combined sequence tokens for the prompt entity using the respective second neural network block of the final dual layer of the one or more dual layers in the neural network. That is, the system can use the outputs of the first and second blocks for the last N combined sequence tokens when processing the last token in the combined sequence. The system then determines the respective representation of the last N combined sequence tokens for the prompt entity by processing the hidden representation and the attended-weight.

The system then updates the dynamic value in the entity memory data for each prompt entity using the representation of the prompt entity (step 408).

In particular, the system can update the dynamic value for a given entity by processing at least the respective representation for the prompt entity using an updating neural network block.

For example, the system can determine a representation weight for the respective representation using the update neural network block and then update the dynamic value in the memory data for the memory entity by processing the dynamic value, the representation weight, and the respective representation. For example, the system can determine the updated dynamic value as a weighted sum of the dynamic value and the representation, with the representation being weighted by the representation weight and the dynamic value being weighted by one minus the representation weight.

A particular example of updating the dynamic value $V_j$ for memory slot j to generate an updated value $$V_j'$$

can satisfy:

$$h_j = softmax\left(\frac{\max_{t=1}^{H} a_{ijt}}{\tau}\right)h,$$

$$w_j = \max_{i=1}^{T}\max_{t=1}^{H} a_{ijt}$$

$$g_j = sigmoid(W_U[h_j, V_j]),$$

$$V_j' = (1 - w_j g_j)V_j + w_j g_j h_j,$$

where H is the total number of attention heads for the last dual layer, $a_{ijt}$ is the cross-attention weight generated for the memory slot j for token i for attention head t, h are the hidden representations of the tokens generated by the last dual layer, T is equal to N, i.e., the number of tokens that have been added to the combined sequence since the last memory update, and $W_U$ is a learned weight matrix.

Figure 5:
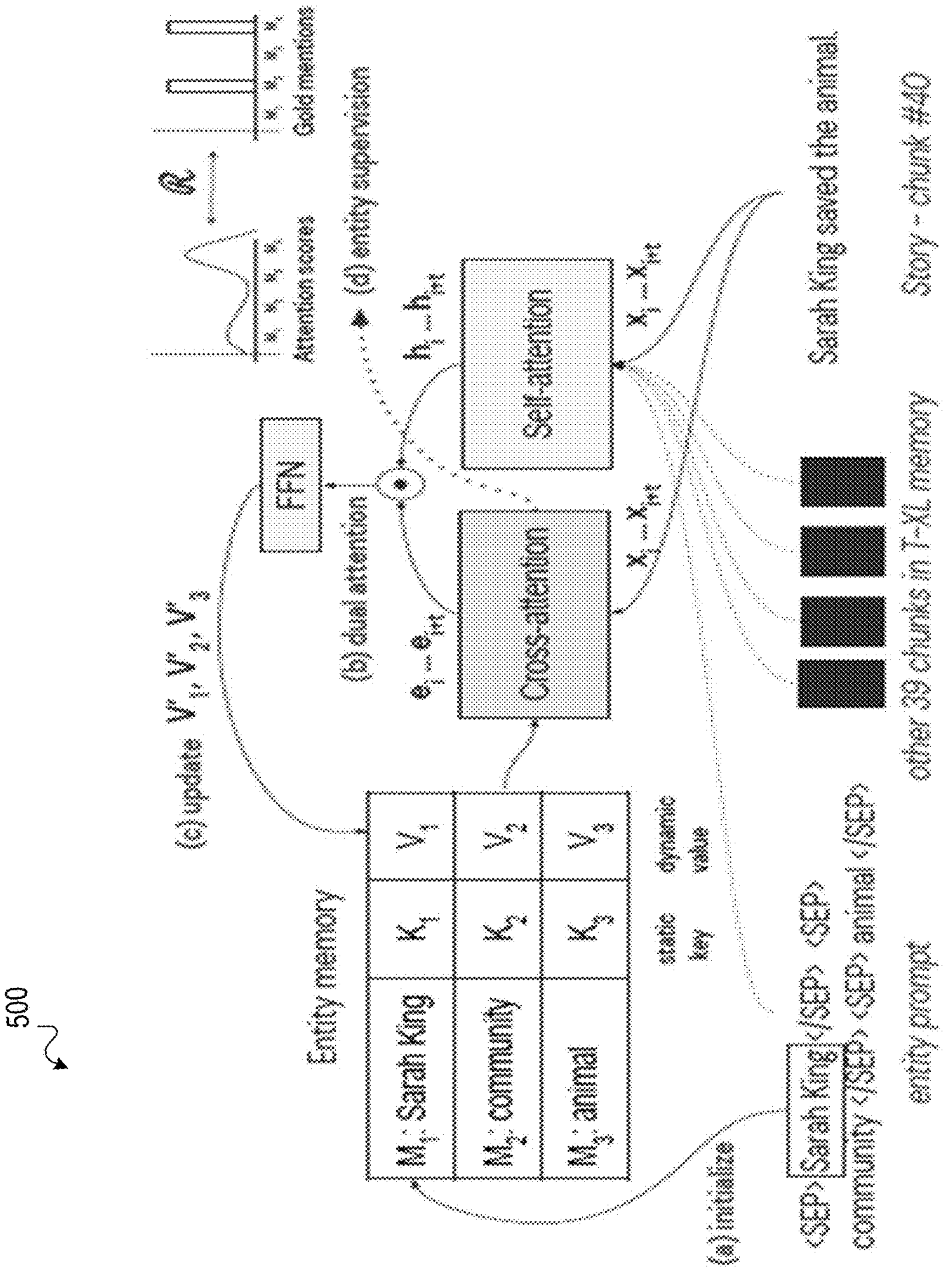
FIG. 5 shows an example of the operation of the system.

FIG. 5 shows an example 500 of the operation of the system.

In the example 500, the entity memory data includes a respective static key and a respective dynamic value for three entities: "Sarah King," "community," and "animal."

The system can represent these three entities in the combined sequence that is processed by the neural network as an entity prompt.

As can be seen in FIG. 5, the neural network makes use of a Transformer-XL to generate a long output sequence in multiple chunks. The system has already generated the first 39 chunks of output sequence that are now represented in the "T-XL" memory and is currently generated the $40^{th}$ chunk.

To generate the next output in the $40^{th}$ chunk, a dual layer within the system operates on a combined sequence that includes the tokens that are derived from the outputs in the chunk that have already been generated ("Sarah King saved the animal") and the entity prompt. Because of the structure of the Transformer-XL, the first block within each dual layer also operates on the representation of the earlier chunks that is stored in the T-XL memory.

In particular, as shown in FIG. 5, a dual layer within the neural network includes a first block that performs self-attention across the combined sequence (and, optionally, the data in the Transformer-XL memory) and a second block that performs cross-attention into the entity memory data for each token in the combined sequence.

The outputs of these two blocks are then combined using a gating mechanism to generate a single layer output token for each token in the combined sequence.

When criteria are satisfied for updating the dynamic values, the system can use an updating neural network ("FFN") to update the dynamic values.

As described above, the neural network can be trained in any of a variety of ways. As shown in FIG. 5, the second neural network blocks can be trained through "entity supervision."

In particular, in some implementations, the respective first neural network blocks for the one or more dual layers can have been pre-trained as part of a different neural network that does not include the respective second neural network blocks. For example, the first neural network blocks can have been pre-trained as part of a different neural network that performs a language modeling task. For example, the different neural network can have been trained through unsupervised learning on a large corpus of unlabeled text data.

After pre-training the respective first neural network blocks, the system can train the neural network on training data that includes target network inputs and a respective target network output for each network input.

In particular, the system can train the neural network to optimize an objective function that measures, for each of a plurality of training network inputs and for each output position in a target network output for the training network input, a respective error between (i) a respective target score distribution over the vocabulary of output tokens for the position, i.e., a target distribution that identifies the corresponding token in the target network output, and (ii) the score distribution generated by the neural network for the output position by processing the training network input.

As shown in FIG. 5, the objective function can also include a regularization loss that measures for each of the one or more dual layers, an error between (i) an intermediate output of the respective second neural network block (the cross-attention scores) and (ii) a target intermediate output for the respective second neural network block (gold mentions).

In some implementations, the system hold the first blocks fixed to the pre-trained values during this training. In some other implementations, the system fine-tunes the first blocks while training the second blocks.

An "embedding," as used in this specification is a vector of numeric values, e.g., floating point or other type of numeric values, that has a predetermined dimensionality, e.g., has a predetermined number of values.

A self-attention block, as referred to above, is a neural network layer that includes an attention mechanism that operates over the self-attention block input (or an input derived from the layer input) to generate the self-attention block output. A self-attention mechanism may be causally masked so that any given position in an input sequence does not attend over (e.g., use data from) any positions after the given position in the input sequence. There are many different possible attention mechanisms. Some examples of self-attention layers including attention mechanisms, are described in Vaswani et al. "Attention is all you need", 31st Conference on Neural Information Processing Systems (NIPS 2017), Long Beach, CA, USA; Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv: 1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell et al. Language models are few-shot learners. arXiv preprint arXiv: 2005.14165, 2020.

Generally, an attention mechanism maps a query and a set of key-value pairs to an output, where the query, keys, and values are all vectors. The output is computed as a weighted sum of the values, where the weight assigned to each value is computed by a compatibility function, e.g., a dot product or scaled dot product, of the query with the corresponding key.

Generally, a self-attention mechanism is configured to relate different positions in the same sequence to determine a transformed version of the sequence as an output. For example the attention layer input may comprise a vector for each element of the input sequence. These vectors provide an input to the self-attention mechanism and are used by the self-attention mechanism to determine a new representation of the same sequence for the attention layer output, which similarly comprises a vector for each element of the input sequence. An output of the self-attention mechanism may be used as the attention layer output, or it may be processed by one or more of feed-forward layers, skip connections, or normalization operations to provide the attention layer output.

In some implementations the attention mechanism is configured to apply each of a query transformation, e.g., defined by a matrix $W^Q$, a key transformation, e.g., defined by a matrix $W^K$, and a value transformation, e.g., defined by a matrix $W^V$, to the attention layer input which is the input data X to the attention layer, to derive a query matrix $Q=XW^Q$ that includes a respective query for each vector in the input sequence, key matrix $K=XW^K$ that includes a respective key for each vector in the input sequence, and value matrix $V=XW^V$ that includes a respective value for each vector in the input sequence, which are used determine an attended sequence for the output. For example the attention mechanism may be a dot product attention mechanism applied by applying each query vector to each key vector to determine respective weights for each value vector, then combining the value vectors using the respective weights to determine the self-attention layer output for each element of the input sequence. The self-attention layer output may be scaled by a scaling factor, e.g., by the square root of the dimensions of the queries and keys, to implement scaled dot product attention. Thus, for example, an output of the attention mechanism may be determined as softmax $$\left(\frac{QK^T}{\sqrt{d}}\right)V$$

where d is a dimension of the key (and value) vector. In another implementation the attention mechanism be comprise an "additive attention" mechanism that computes the compatibility function using a feed-forward network with a hidden layer. The output of the attention mechanism may be further processed by one or more fully-connected, feed forward neural network layers.

The attention mechanism may implement multi-head attention, that is, it may apply multiple different attention mechanisms in parallel. The outputs of these may then be combined, e.g., concatenated, with a learned linear transformation applied to reduce to the original dimensionality if necessary.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term “database” is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term “engine” is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user’s device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
- receiving data identifying one or more prompt entities;
- receiving an input sequence that comprises one or more input tokens;
- maintaining entity memory data comprising respective entity data for each of the one or more prompt entities, wherein the respective entity data for each prompt entity comprises a respective entity representation of the prompt entity; and
- processing the input sequence and the entity memory data using a neural network having one or more dual layers, wherein each dual layer comprises at least (i) a respective first neural network block and (ii) a respective second neural network block, to generate an output sequence that comprises a respective output token for each of one or more output positions in the output sequence, comprising, for each output position:
  - for each of the one or more dual layers:
    - receiving a layer input for the output position that is based on at least the input sequence and that comprises one or more layer input tokens;
    - processing the layer input using the respective first neural network block to generate a respective hidden representation of each layer input token in the layer input, wherein processing the layer input using the respective first neural network block comprises performing self-attention across at least the one or more layer input tokens;
    - processing the layer input and the entity memory data using the respective second neural network block to generate a respective entity-aware representation of each layer input token in the layer input, wherein processing the layer input and the entity memory data comprises, for each layer input token, processing the layer input token using a cross-attention neural network layer that applies cross-attention with a query derived from the layer input token and keys and values derived from at least the respective entity representations in the entity memory data; and
    - processing the hidden representations and the entity-aware representations to generate a layer output for the output position that has one or more layer output tokens.

2. The method of claim 1, wherein the neural network autoregressively generates each output token of the output sequence by, for each output position, processing a combined sequence that comprises at least a concatenation of the input sequence and any output tokens in the output sequence preceding the output position, and wherein the layer input for each output position is derived from the combined sequence.

3. The method of claim 2, wherein each of the one or more prompt entities is identified by one or more tokens, and the combined sequence further comprises, for each prompt entity, the one or more tokens that identify the prompt entity.

4. The method of claim 3, wherein, for each dual layer, processing the hidden representations and the entity-aware representations to generate the layer output comprises:
- combining the hidden representations and the entity-aware representations using a gating neural network block that has a plurality of gating parameters to generate the layer output tokens in the layer output.

5. The method of claim 4, wherein combining the hidden representations and the entity-aware representations using the gating neural network block that has a plurality of gating parameters to generate the layer output comprises:
- for each hidden representation:
  - processing the hidden representation and the corresponding entity-aware representation in accordance with the plurality of gating parameters to generate a respective gating vector; and
  - combining the hidden representation and the corresponding entity-aware representation in accordance with the respective gating vector to generate a respective layer output token in the layer output.

6. The method of claim 5, wherein processing the hidden representation and the corresponding entity-aware representation in accordance with the plurality of gating parameters to generate the respective gating vector comprises:
- concatenating the hidden representation and the entity-aware representation to generate a combined representation; and
- processing the combined representation in accordance with the gating parameters to generate the respective gating vector.

7. The method of claim 5, wherein combining the hidden representation and the corresponding entity-aware representation in accordance with the respective gating vector to generate the respective layer output token comprises:
- processing the respective gating vector to generate a hidden weight vector;
- performing an elementwise multiplication of the hidden weight vector and the hidden representation to generate an intermediate hidden representation;
- processing the respective gating vector to generate an entity weight vector;
- performing an elementwise multiplication of the entity weight vector and the entity-aware representation to generate an intermediate entity-aware representation; and
- summing the intermediate hidden representation and the intermediate entity-aware representation to generate the respective layer output token.

8. The method of claim 1, further comprising, before processing the input sequence and the entity memory data using the neural network to generate the output sequence:
- initializing the respective entity representation of each prompt entity in the entity memory data by processing the data identifying the prompt entity.

9. The method of claim 8, wherein initializing the respective entity representation of each prompt entity in the entity memory data by processing the data identifying the prompt entity comprises:

processing the data identifying the prompt entity using the neural network while, for each dual layer using only the respective first neural network block of the dual layer and not the respective second neural network block of the dual layer.

10. The method of claim 8, wherein initializing the respective entity representation of each prompt entity in the entity memory data by processing the data identifying the prompt entity comprises:

processing each token in the respective data that identifies the prompt entity using the neural network to generate a respective embedding of the token, wherein processing the tokens using the neural network comprises, for each dual layer:

receiving a layer input that comprises one or more layer input tokens, wherein each layer input token corresponds to a respective one of the tokens that identify the prompt entity; and processing the layer input tokens using the respective first neural network block to generate the respective layer output token for each layer input token without using the respective second neural network block of the dual layer; and initializing the respective entity representation for the prompt entity using the respective embeddings of the tokens for the prompt entity.

11. The method of claim 10, wherein initializing the respective entity representation for the prompt entity using the respective embeddings of the tokens for the respective prompt entity comprises:

determining an average of the respective embeddings of the tokens for the prompt entity; and initializing the respective entity representation for the prompt entity using the average of the respective embeddings of the tokens for the prompt entity.

12. The method of claim 11, wherein the respective entity representation for each of the one or more prompt entities is a respective static key, and wherein initializing the respective entity representation for each prompt entity comprises:

initializing the respective static key for the prompt entity as the average of the respective embeddings for the tokens for the prompt entity.

13. The method of claim 11, wherein the respective entity representation for each of the one or more prompt entities is a combination of a respective static key and a respective dynamic value, and wherein initializing the respective entity representation for each prompt entity using the average of the respective embeddings of the tokens for the prompt entity comprises:

initializing the respective static key for the prompt entity as the average of the respective embeddings for the tokens for the prompt entity; and initializing the respective dynamic value for the prompt entity as the average of the respective embeddings for the tokens for the prompt entity.

14. The method of claim 13, wherein maintaining entity memory data comprising respective entity data for each of the one or more prompt entities, wherein the respective entity data for each prompt entity comprises a respective entity representation of the prompt entity, comprises:

after each Nth token is added to the combined sequence, updating the respective dynamic value in the entity memory data for each of the one or more prompt entities, wherein Nis a fixed integer greater than one.

15. The method of claim 14, wherein updating the respective dynamic value in the entity memory data for each of the one or more prompt entities comprises:

determining a respective representation of the last N combined sequence tokens for each of the one or more prompt entities; and updating the dynamic value in the entity memory data for each prompt entity by processing at least the respective representation for the prompt entity using an update neural network block.

16. The method of claim 15, wherein determining the respective representation of the last N combined sequence tokens for each of the one or more prompt entities comprises:

determining the hidden representation of the last N combined sequence tokens using the respective first neural network block of a final dual layer of the one or more dual layers in the neural network;

determining a respective attended-weight for the last N combined sequence tokens for the prompt entity using the respective second neural network block of the final dual layer of the one or more dual layers in the neural network; and determining the respective representation of the last N combined sequence tokens for the prompt entity by processing the hidden representation and the attended-weight.

17. The method of claim 15, wherein updating the dynamic value in the memory data for each prompt entity by processing at least the respective representation using an update neural network block comprises:

determining a representation weight for the respective representation using the update neural network block; and updating the dynamic value in the memory data for the memory entity by processing the dynamic value, the representation weight, and the respective representation.

18. The method of claim 1, wherein the entity memory data further comprises respective non-entity data for each of one or more non-entities that represents entity-irrelevant information.

19. The method of claim 1, wherein processing the input sequence and the entity memory data using a neural network having one or more dual layers further comprises, for each of the output positions:

processing the layer output for the output position from a final dual layer of the one or more dual layers in the neural network to generate a respective score distribution over a vocabulary of output tokens for the output position in the output sequence; and selecting a respective output token from the vocabulary of output tokens for the output position based on the respective score distribution for the output position.

20. The method of claim 19, wherein the respective first neural network blocks for the one or more dual layers have been pre-trained as part of a different neural network that does not include the respective second neural network blocks.

21. The method of claim 20, further comprising, after pre-training the respective first neural network blocks, training the neural network to optimize an objective function that measures, for each of a plurality of training network inputs and for each output position in a target network output for the training network input, a respective error between (i) a respective target score distribution over the vocabulary of output tokens for the position, and (ii) the score distribution generated by the neural network for the output position by processing the training network input.

22. The method of claim 21, wherein the objective function further measures a regularization loss for each of the one or more dual layers between (i) an intermediate output of the respective second neural network block and (ii) a target intermediate output for the respective second neural network block.

23. The method of claim 22, wherein the intermediate outputs are cross-attention weights generated by a cross-attention layer within the respective second neural network block and the target intermediate output is a target set of cross-attention weights.

24. A system comprising:

one or more computers; and one or more storage devices communicatively coupled to the one or more computers, wherein the one or more storage devices store instructions that, when executed by the one or more computers, cause the one or more computers to perform operations comprising:

receiving data identifying one or more prompt entities;

receiving an input sequence that comprises one or more input tokens;

maintaining entity memory data comprising respective entity data for each of the one or more prompt entities, wherein the respective entity data for each prompt entity comprises a respective entity representation of the prompt entity; and processing the input sequence and the entity memory data using a neural network having one or more dual layers, wherein each dual layer comprises at least (i) a respective first neural network block and (ii) a respective second neural network block, to generate an output sequence that comprises a respective output token for each of one or more output positions in the output sequence, comprising, for each output position:

for each of the one or more dual layers:

receiving a layer input for the output position that is based on at least the input sequence and that comprises one or more layer input tokens;

processing the layer input using the respective first neural network block to generate a respective hidden representation of each layer input token in the layer input, wherein processing the layer input using the respective first neural network block comprises performing self-attention across at least the one or more layer input tokens;

processing the layer input and the entity memory data using the respective second neural network block to generate a respective entity-aware representation of each layer input token in the layer input, wherein processing the layer input and the entity memory data comprises, for each layer input token, processing the layer input token using a cross-attention neural network layer that applies cross-attention with a query derived from the layer input token and keys and values derived from at least the respective entity representations in the entity memory data; and processing the hidden representations and the entity-aware representations to generate a layer output for the output position that has one or more layer output tokens.

25. One or more non-transitory computer storage media storing instructions that when executed by one or more computers cause the one or more computers to perform operations comprising:

receiving data identifying one or more prompt entities;

receiving an input sequence that comprises one or more input tokens;

maintaining entity memory data comprising respective entity data for each of the one or more prompt entities, wherein the respective entity data for each prompt entity comprises a respective entity representation of the prompt entity; and processing the input sequence and the entity memory data using a neural network having one or more dual layers, wherein each dual layer comprises at least (i) a respective first neural network block and (ii) a respective second neural network block, to generate an output sequence that comprises a respective output token for each of one or more output positions in the output sequence, comprising, for each output position:

for each of the one or more dual layers:

receiving a layer input for the output position that is based on at least the input sequence and that comprises one or more layer input tokens;

processing the layer input using the respective first neural network block to generate a respective hidden representation of each layer input token in the layer input, wherein processing the layer input using the respective first neural network block comprises performing self-attention across at least the one or more layer input tokens;

processing the layer input and the entity memory data using the respective second neural network block to generate a respective entity-aware representation of each layer input token in the layer input, wherein processing the layer input and the entity memory data comprises, for each layer input token, processing the layer input token using a cross-attention neural network layer that applies cross-attention with a query derived from the layer input token and keys and values derived from at least the respective entity representations in the entity memory data; and processing the hidden representations and the entity-aware representations to generate a layer output for the output position that has one or more layer output tokens.

* * * * *